May 27, 1930. E. R. POPE 1,760,438
FASTENING SUPPLYING APPARATUS
Filed Sept. 7, 1927
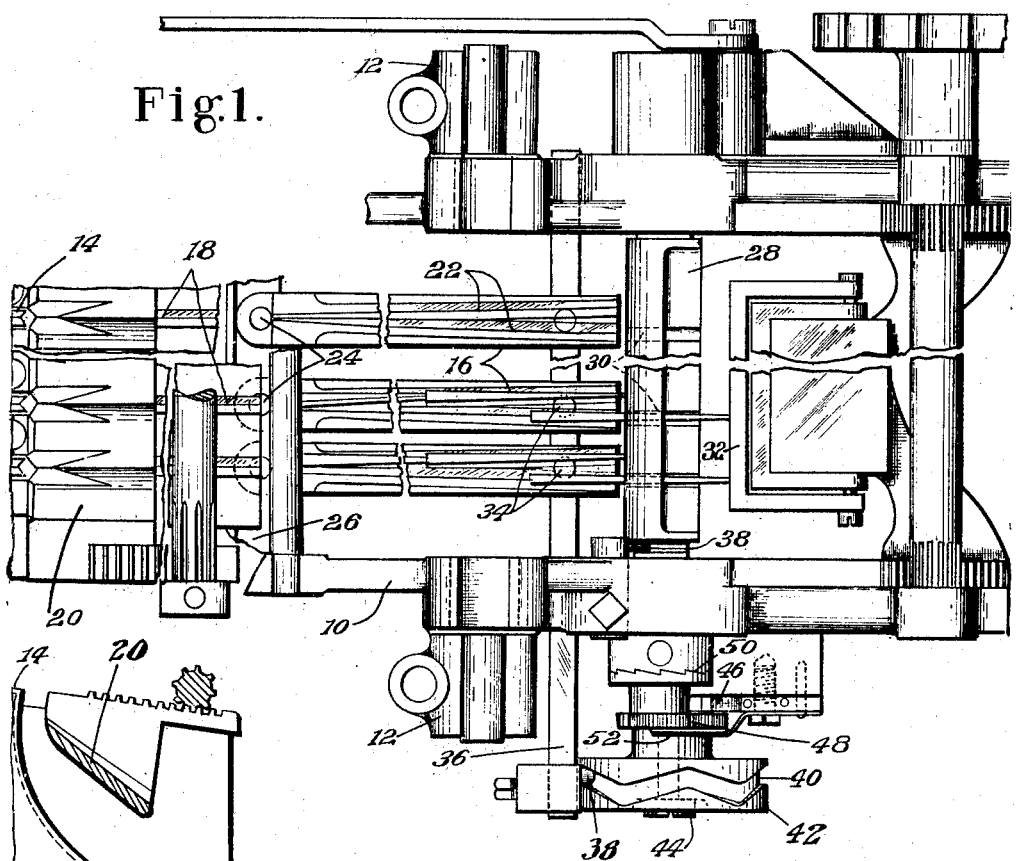
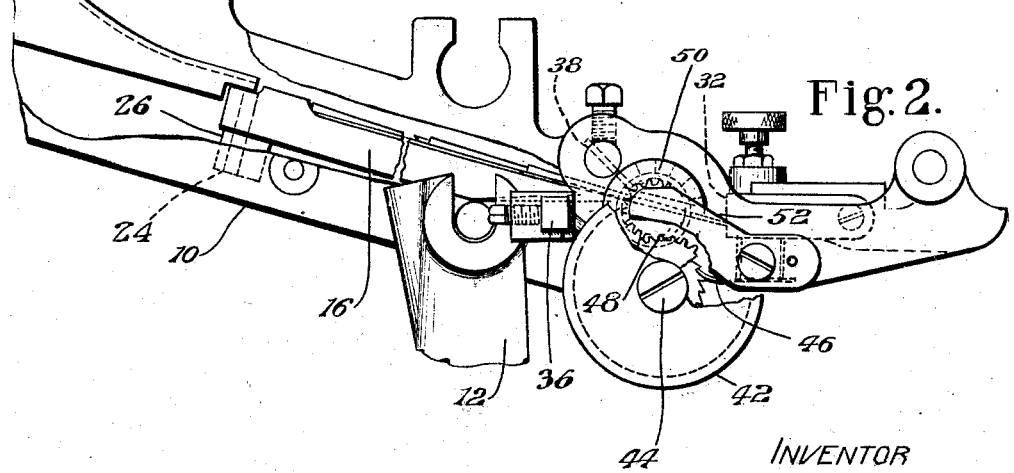
INVENTOR
Elmer R. Pope Patented May 27, 1930

1,760,438

UNITED STATES PATENT OFFICE

ELMER R. POPE, OF HAMILTON, MASSACHUSETTS, ASSIGNOR TO UNITED SHOE MACHINERY CORPORATION, OF PATERSON, NEW JERSEY, A CORPORATION OF NEW JERSEY

FASTENING-SUPPLYING APPARATUS

Application filed September 7, 1927. Serial No. 217,987.

My invention relates to apparatus for supplying fastenings to various machines, it having marked utility in connection with machines to which fastenings of considerable length are delivered. The nail-distributors of machines for heeling shoes furnish an example of a field in which my invention may advantageously be employed. Such fastening-supplying apparatus commonly includes raceways, having at least one groove along which the fastenings are advanced in series lying end to end, the delivery of the terminal fastening being controlled by some such movable device as a perforated discharge-roll. If the mechanism by which the fastenings are caused to travel along the grooves, as that by which the raceway is oscillated, is maintained unchanged, there may be a fastening-length, say of three inches, such that after a delivery has been made and before the succeeding fastening has reached the discharge device this will have again started in operation. Under these conditions, a load may be missed.

An object of this invention is to provide, constantly and without adjustment of the apparatus as the length of the fastenings varies, for the delivery of a load of these fastenings each time the discharge device operates. For the achievement of this object, I associate with a raceway, in which the fastenings may lie end to end, means arranged to hold said fastenings side by side at the delivering end and provide for the successive discharge of such fastenings lying side by side. This holding means may be furnished, for a primary raceway-groove or conveying means, by a plurality of secondary grooves for each primary groove, all of said secondary grooves delivering to a passage. These secondary grooves are shown as two in number, formed in a movable bar and diverging toward their delivery-ends. In this way, I am able to furnish two sources of supply from which to draw, with the certainty that a fastening will always be available in one of these. The delivery from the plural raceways is under the control of the roll or other discharge device with which all the terminal fastenings are in engagement, as by bringing one and then another of the secondary grooves into registration with a delivering opening of the discharge-roll. This movement, which is shown as created by lateral oscillation of the bar carrying the secondary grooves, is preferably effected by connection to the discharge device, thus giving a very simple structure.

In the accompanying drawing, which illustrates a single embodiment of my invention, Fig. 1 is a broken top plan view of that part of a nail-distributor to which the present improvements more directly apply; and Fig. 2 is a similar side elevation.

I have chosen to disclose the invention in connection with the nail-distributor of United States Patent No. 1,005,303, Pope, October 10, 1911. Here, the inclined nail-way or raceway-frame 10 oscillates continuously in the operation of the apparatus upon levers 12 and has a main conveying section or washboard 14 and a continuing section furnished by bars 16. The nails fed to the nail-way from a drum (not shown) are conveyed along the main section under the influence of the oscillation of the frame in parallel grooves 18 in which they lie end to end. Before leaving the section 14, the nails are, if necessary, turned by a balancing bar 20 so that the points all lie in the same direction, then entering secondary grooves 22 in the bars 16. The grooves of each bar are shown as two in number, meeting at a point beneath the end of one of the main-section or primary grooves 18 and diverging therefrom toward their delivering ends. At the inner end, each bar is pivoted at 24 for lateral oscillation upon a cross-bar 26 of the frame 10, and there is means, which will later be described, to produce this oscillation through a definite angle. At one extreme of this movement, one of the two grooves 22 of each pair is substantially alined with its primary groove 18, which lies in the same vertical plane, while at the opposite extreme the companion groove assumes this position. The nails, after leaving each groove 18, therefore tend to be received by the groove of the corresponding bar which is at that time alined with it.

Opposite the ends of the bars 16 is located a perforated discharge-roll 28, journaled for oscillation about its axis upon the frame 10. This movement is from a receiving position, in which an opening 30, furnishing a portion of a receiving conduit, is in registration with one of the grooves in each of the bars 16, to one in which nails in the openings will slide from the roll under the influence of gravity and fall to the machine supplied. A bar 32 stops the nails in the roll-openings in the correct relation for discharge. The actuation of the roll may be as in the previously mentioned patent.

The forward extremities of the bars 16 appear as connected at 34 to a slide 36 movable transversely of the frame. Projecting downwardly and forwardly from the slide 36 is a pin 38 entering a cam-groove 40 in a wheel 42 mounted to turn upon a stud 44 projecting from the frame 10. Against clockwise rotation, as viewed in Fig. 2 of the drawing, the wheel 42 is held by a detent 46. Said wheel is intermittently rotated anti-clockwise through spur-gearing 48 and ratchet mechanism 50 connecting it with the shaft of the discharge-roll 28. The ratchet mechanism is in two sections, one fast upon the roll-shaft and the other rotatable about said shaft and capable of yielding from the companion section against a spring 52. This last-mentioned section carries one of the gears 48. When the discharge-roll is moving from its delivering position back to normal, the elements of the ratchet mechanism 50 separate, and the detent 46 holds the wheel 42 against rotation. Consequently, no effect is produced upon the bar 36. Upon movement of the discharge-roll in the opposite direction, however, the ratchet mechanism is in active engagement, causing the wheel 42 to be rotated through the gearing 48. The cam-groove 40 thereupon causes the longitudinal movement of the slide 36 in one direction. As a result of this, the groove 22 of each raceway-bar 16 which has been alined with an opening 30 in the roll is carried away from this opposite and imperforate portion of the roll, while the companion groove in the bar is brought into registration with the opening. It will consequently be seen that as soon as a nail has been delivered from a discharge-roll-opening, another nail is brought into position ready to enter the opening, and has to move only from the inner surface of the roll to the stop-bar 32 to be ready for discharge. With the customary arrangements of raceways, in which each nail travels in a single unvarying groove, it is necessary, in addition to the space just described, for such nail to advance through the distance between the inner side of the roll and the point at which the head of the preceding nail was located. With long nails, this may be too great a space to be traversed with certainty. But with the shorter travel of the herein-described organization, unaffected by nail-length, there is ample time for unfailing delivery between successive oscillations of the discharge-roll. Upon the next operation of the roll, the cam-groove 40 swings the bars 16 in the opposite direction, to present to the delivering-openings the nails in the associated grooves. In each instance, that groove which is alined with the corresponding washboard-groove 18 is receiving nails therefrom, so that when it is shifted after delivery, it contains a plurality of nails, or that number which its entire length will accomodate, less the one which it has just delivered.

Having described my invention, what I claim as new and desire to secure by Letters Patent of the United States is:

1. In a fastening-supplying apparatus, a raceway in which the fastenings lie end to end, means arranged to hold the fastenings side by side at the delivering end of the raceway, and means for causing the successive delivery of such fastenings lying side by side from the raceway.

2. In a fastening-supplying apparatus, a raceway having a plurality of grooves, means arranged to hold a pair of fastenings side by side at the delivering end of each groove, a receiving conduit associated with each groove, and means for moving each holding means to cause the successive delivery of the fastenings of the pair to the same receiving conduit.

3. In a fastening-supplying apparatus, a raceway having a plurality of grooves, a discharge device to which the raceway delivers, and means arranged to hold a pair of fastenings side by side at the delivering end of the grooves in engagement with the discharge device.

4. In a fastening-supplying apparatus, a raceway provided with fastening-conveying grooves, a discharge device having a fastening-receiving portion individual to each groove, and means arranged to hold a fastening conveyed by the groove at the discharge device ready for delivery to the receiving portion while another fastening from the groove is being discharged by said portion.

5. In a fastening-supplying apparatus, a raceway having a primary fastening-conveying groove and a plurality of secondary grooves movable into receiving relation with the delivering end of said primary groove, and a member provided with a passage to which all the secondary grooves of each primary groove deliver.

6. In a fastening-supplying apparatus, a raceway having a primary fastening-conveying groove and two secondary grooves alternately movable into receiving relation with the delivering end of said primary groove, the primary groove with either of the secondary grooves being arranged to together hold a series of fastenings lying end to end, and means arranged to control the delivery of fastenings from the secondary grooves.

7. In a fastening-supplying apparatus, a raceway having a main fastening-conveying groove and two branch grooves diverging from a meeting point at the delivering end of the main groove, and means for moving the portion of the raceway containing the branch grooves to present one or another of said branch grooves for the reception of fastenings from the main groove.

8. In a fastening-supplying apparatus, a raceway having a primary fastening-conveying groove and a plurality of secondary grooves at the delivering end of said primary groove, a movable discharge device to which the raceway delivers, and means under the influence of the discharge device arranged to control the delivery of fastenings from the secondary grooves.

9. In a fastening-supplying apparatus, a raceway having a main fastening-conveying groove and two branch grooves diverging from its delivery end, a movable discharge device to which the raceway delivers, and connections to the discharge device for moving the portion of the raceway containing the branch grooves to present one or another of said branch grooves for the reception of fastenings from the main groove.

10. In a nail-distributor, a nail-way having a main section provided with a nail-conveying groove, and a grooved bar arranged to oscillate upon the nail-way and to receive as a result of its oscillation nails from a single groove only of the main section.

11. In a nail-distributor, a nail-way having a main section provided with a nail-conveying groove, a bar having a plurality of grooves meeting at one end and diverging to the opposite end and to which the groove in the main section may deliver, and means for moving the bar to present any one of said grooves for reception from the main section.

12. In a nail-distributor, a nail-way having a main section provided with a nail-conveying groove, a bar pivoted beneath the main-section groove and having two grooves diverging therefrom to their delivering ends, and means for oscillating the bar laterally.

13. In a nail-distributor, a nail-way having a main section in which is a nail-conveying groove, a bar provided with two grooves arranged to receive nails from the main-section groove, a discharge-roll having a receiving opening, and means arranged to produce registration between the roll-opening and either of the bar-grooves.

14. In a nail-distributor, a nail-way having a main section in which is a nail-conveying groove, a bar provided with two grooves arranged to receive nails from the main-section groove, a discharge-roll having a receiving opening, and means for moving the bar to bring either groove into registration with the roll-opening.

15. In a nail-distributor, a nail-way having a main section in which is a nail-conveying groove, a bar provided with two grooves arranged to receive nails from the main-section groove, a rotatable discharge-roll having a receiving opening, and connections between the roll and bar arranged to move said bar to bring either groove opposite the roll-opening.

16. In a nail-distributor, a nail-way having a main section in which is a nail-conveying groove, a bar pivoted beneath the main-section groove and provided with two forwardly diverging grooves, a discharge-roll having a receiving opening, and connections to the discharge-roll for oscillating the bar to present alternately the separated ends of the bar-grooves to the receiving opening.

17. In a nail-distributor, a nail-way having parallel main grooves each arranged to support a series of nails lying end to end, and branch grooves diverging from the delivering extremity of each of the main grooves.

In testimony whereof I have signed my name to this specification.

ELMER R. POPE.